E. W. LEIGH.
MANUFACTURE OF HOLLOW OR LIKE EARTHENWARE.
APPLICATION FILED JUNE 27, 1914.
1,135,825.
Patented Apr. 13, 1915.
9 SHEETS—SHEET 5.
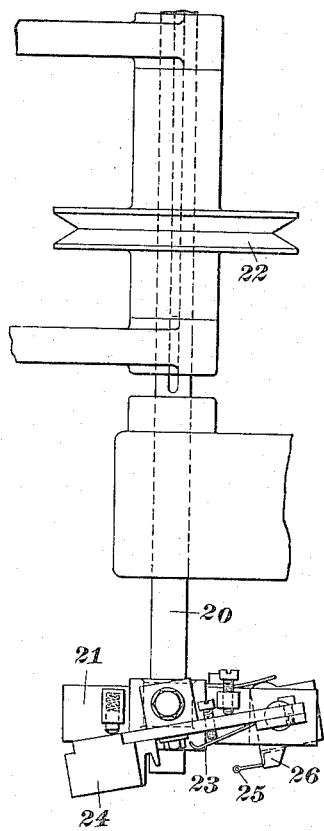
Fig. 6
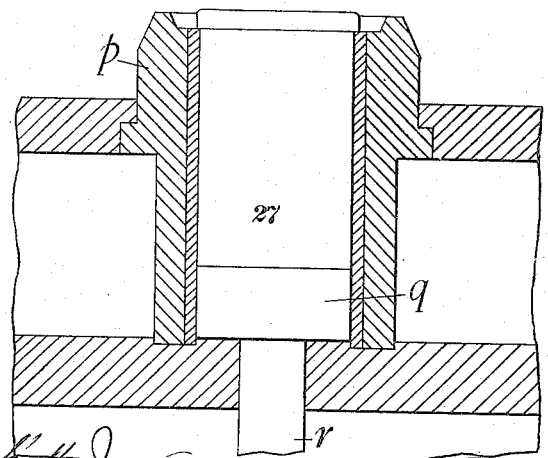
WITNESSES
INVENTOR
EDMUND WILLIAM LEIGH
BY
ATTORNEYS

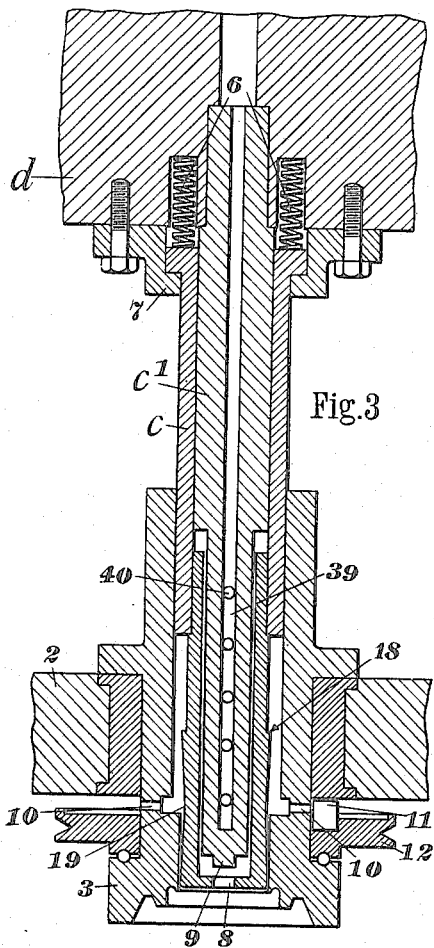
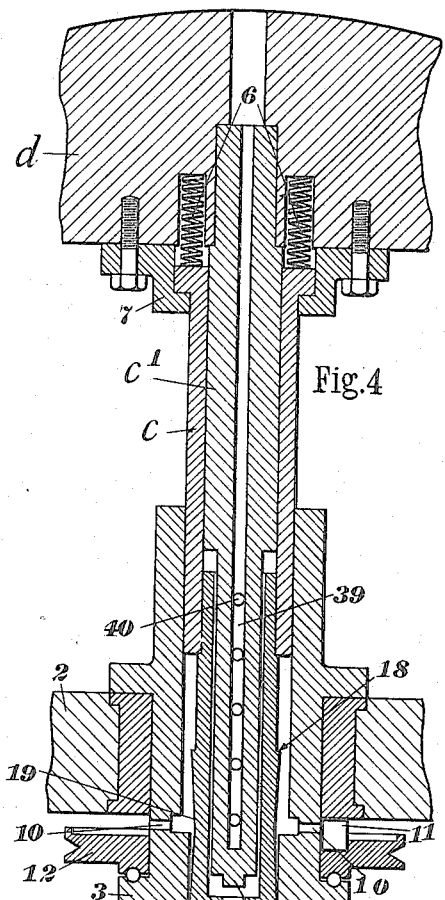
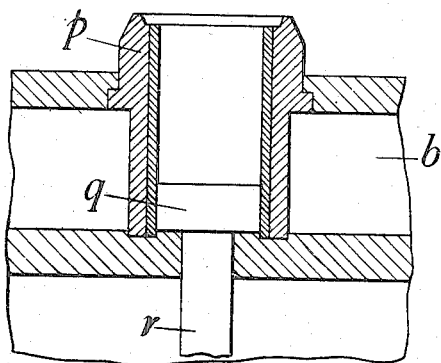

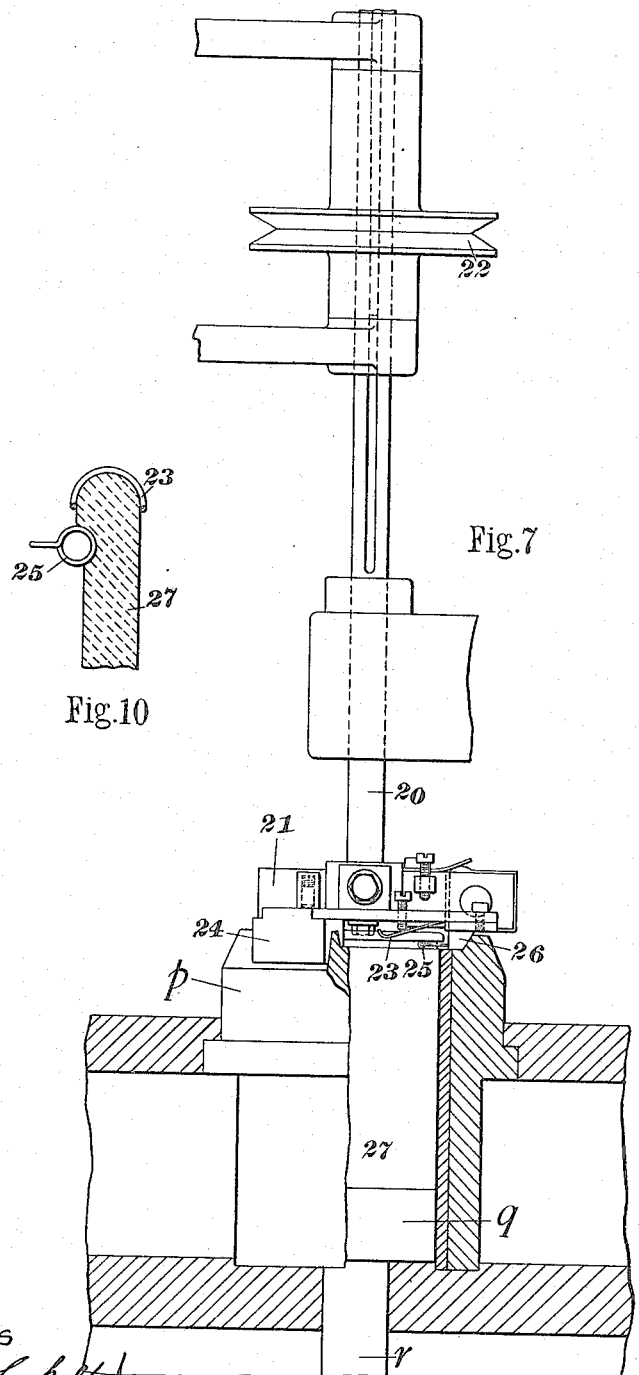

E. W. LEIGH.
MANUFACTURE OF HOLLOW OR LIKE EARTHENWARE.
APPLICATION FILED JUNE 27, 1914.

1,135,825.

Patented Apr. 13, 1915.
9 SHEETS—SHEET 7.

WITNESSES

INVENTOR
EDMUND WILLIAM LEIGH
BY
ATTORNEYS

E. W. LEIGH.
MANUFACTURE OF HOLLOW OR LIKE EARTHENWARE.
APPLICATION FILED JUNE 27, 1914.

1,135,825.

Patented Apr. 13, 1915.
9 SHEETS—SHEET 9.

WITNESSES

INVENTOR
EDMUND WILLIAM LEIGH
BY
ATTORNEYS

UNITED STATES PATENT OFFICE.

EDMUND WILLIAM LEIGH, OF BURTON-UPON-TRENT, ENGLAND, ASSIGNOR TO JOHN SMITH HALL, OF ASHBY-DE-LA-ZOUCH, ENGLAND.

MANUFACTURE OF HOLLOW OR LIKE EARTHENWARE.

1,135,825.

Specification of Letters Patent.

Patented Apr. 13, 1915.

Application filed June 27, 1914. Serial No. 847,710.

*To all whom it may concern:*

Be it known that I, EDMUND WILLIAM LEIGH, subject of the King of Great Britain, residing at Ambleside, Midway, Burton-upon-Trent, England, engineer, have invented certain new and useful Improvements Relating to the Manufacture of Hollow or like Earthenware, of which the following is a specification.

This invention has for its object to construct an improved machine for the manufacture of hollow or like earthenware, such, for example, as pots or jars, for containing preserves and other food stuffs.

Referring to the nine accompanying sheets of explanatory drawings:—Figures 1 and 2 are front and side elevations of a machine constructed in accordance with this invention for the manufacture of jam pots and the like.

Figs. 3, 4 and 5 are vertical sections showing the clay molding portions of the machine in three different positions.

Figs. 6, 7 and 8 are part sectional elevations.

Fig. 10 is a detail diagram of the trimming tools to a larger scale than Figs. 6 to 9.

In the construction of a machine for molding jam pots and the like in accordance with this invention, I employ a bed $a$ having a rotatable work table $b$ mounted thereon. In conjunction with the bed is any convenient framing or support for the belt pulleys, gear train, and other mechanisms hereinafter described from which the respective motions of the operative parts of the machine are derived.

The pressing ram $c$ or like part is fitted to the underside of a crosshead $d$ which is guided during its rising and falling movements by vertically disposed bars or columns $e$ bolted or secured to the bed of the machine. At the upper ends of the said columns there is fixed a stay or crosspiece $f$. The necessary reciprocatory motion is imparted to the crosshead $d$ by means of side rods $g$ operated by rotating crank pins $h$, or their equivalent, forming part of the driving mechanism arranged in or upon the framing of the machine.

Intermittent rotary movements are imparted to the work table $b$ by ratchet or other mechanism conveniently operated by eccentrics to which may also be secured the crank pins $h$ aforesaid. A central vertical shaft $i$ is secured to the table $b$ and passing through the bed has mounted on its lower end a ratchet $j$. Freely rotatable on the said shaft are a pair of collars $k$ between which is pivoted a pawl $l$ arranged to actuate the ratchet. The pawl is connected by a rod $m$ to a slide $n$ which receives a reciprocatory motion from the eccentrics $o$. The table is fitted with four or other number of open ended shells $p$ serving as the dies for the formation of the required pots or jars. In the lower end of each of such dies there is provided a sliding bottom piece $q$ having extending from its lower side a stem $r$ which, as each die is brought to the discharging position, is pressed up by a mechanically actuated push rod $s$ in order to lift the bottom piece up the die for the ejection of the pot formed therein. Actuation of the push rod is effected by a crank pin $t$ secured between a pair of crank disks $u$ on the coaxial shafts carrying the eccentrics $o$. The crank pin $t$ operates once in each revolution a weighted or spring controlled lever $v$ connected by a link to a lever $w$ attached to the push rod. It will be understood that the stems $r$ of the bottom pieces $q$ move around an annular channel in the bed $a$ and are in succession carried opposite the upper end of the push rod for actuation thereby.

Figure 1:
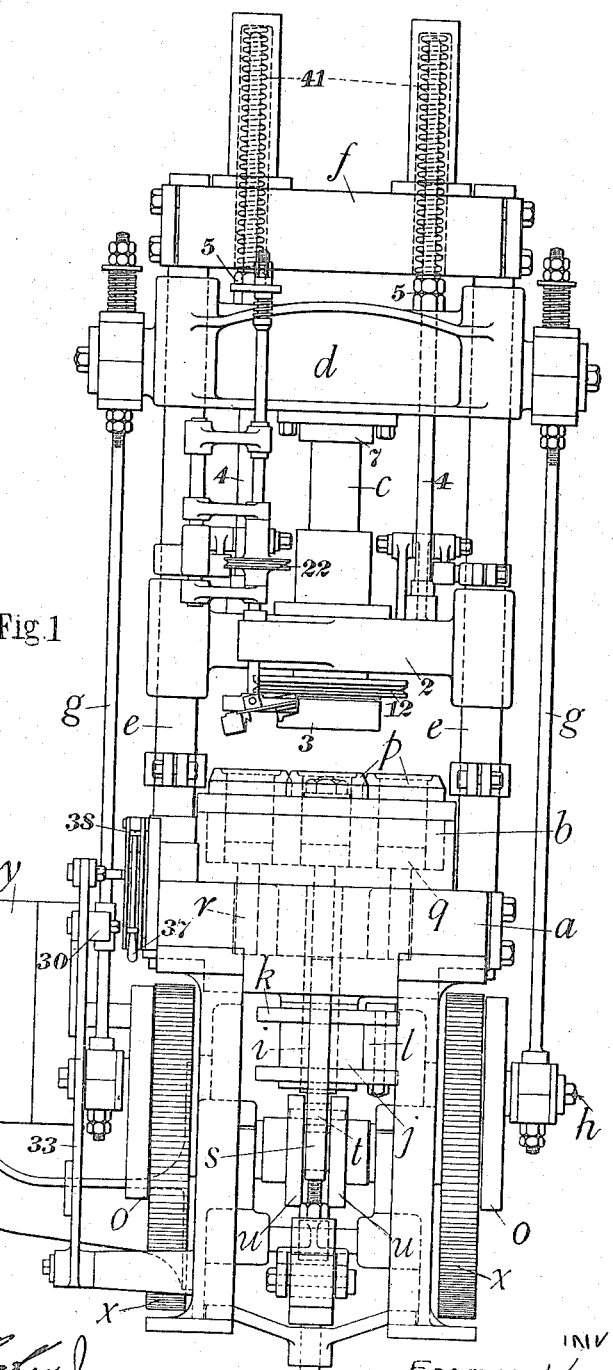
Figure 2:
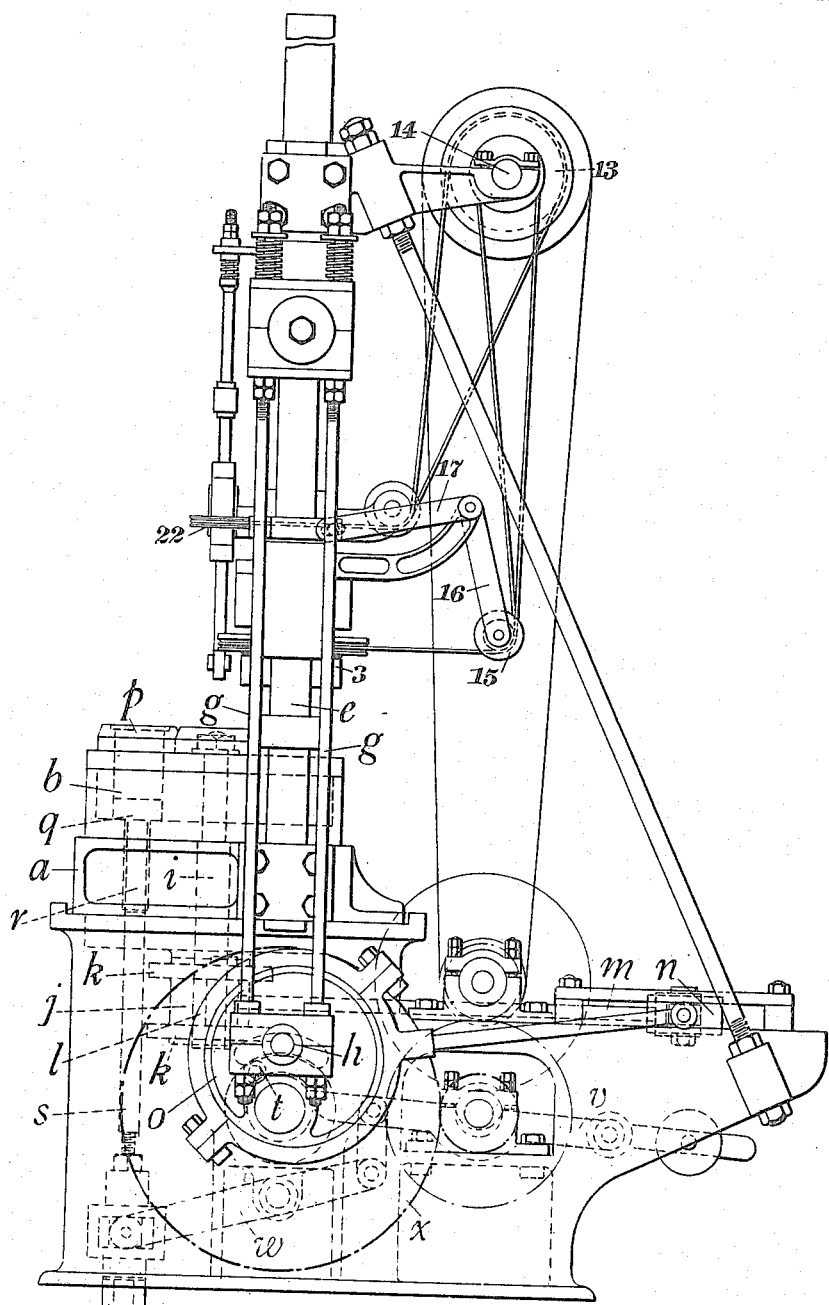

Rotation of the shafts carrying the eccentrics $o$ and crank disks $u$ is effected by gear wheels $x$ which receive their motion through any convenient system of pinions from the belt pulleys $y$. The eccentrics are loosely mounted on their shafts and are bolted to the adjacent faces of the gear wheels $x$ which are keyed to the said shafts. By the provision of suitable slots or bolt holes in either the eccentrics or the gear wheels angular adjustment can be made between the said parts to produce the required synchronization of the movements of the plunger and table. To avoid a confusion of lines in Figs. 1 and 2 the table has been shown rotated slightly in advance of its true position relatively to the positions of the eccentrics and plunger.

The pieces of clay or the like from which the pots are formed preferably consist of approximately circular solid billets or slabs prepared in any ordinary manner. They may be comparatively free from moisture, the material being of such consistency that while it will flow under the forming pressure imposed on it in the machine, it permits the cutting of the string groove near the top of the jar to be effected, and enables the jar to retain its shape during such process and during and after its removal from the machine.

Each billet is preferably dipped in oil or the like before its insertion in the die. The relationship of the die and pressing ram when the billet is placed in the die is shown in Fig. 3. On its first movement from the billet inserting position (by the intermittent or step by step rotation of the work plate), each die $p$ with the billet therein is brought to the next rest position which is beneath the pressing ram $c$. As the pressing ram descends there descends also, under the action of gravity assisted by springs, a supplementary crosshead 2 carrying a cover piece 3 which closes the upper end of the die. The crosshead 2 slides on the vertical guides $e$. Rods 4 attached at their lower ends to the part 2 pass freely through the crosshead $d$. Nuts 5 on the rods enable the crosshead 2 to be lifted by the crosshead $d$. The springs 41 are arranged within the crosspiece $f$ and adapted to act upon the upper ends of the rods 4. Preferably the adjacent parts of the cover 3 and die $p$ are shaped to interengage as shown, and the die is fitted with a renewable lining. The stroke or movement of the pressing ram exceeds that of the crosshead 2, and is sufficient to enable the ram to enter the die and cause the material to flow to the required shape for the formation of the pot.

It will be observed that the pressing ram is constructed from a pair of concentrically arranged and relatively movable parts $c$ and $c'$. The former is shaped at its lower end to the required form and size for producing the internal surfaces of the pot.

Movement relatively to the inner part $c'$ is produced in the downward direction by springs 6 placed between the upper end of the part $c$ and the crosshead $d$, such movement being limited by a shoulder on the part $c$ which abuts against the inner side of a ring 7 on the crosshead. Movement in the opposite direction is produced against the action of the springs by pressure on the material in the die, and is limited by contact with the underside of the crosshead.

Figure 5:
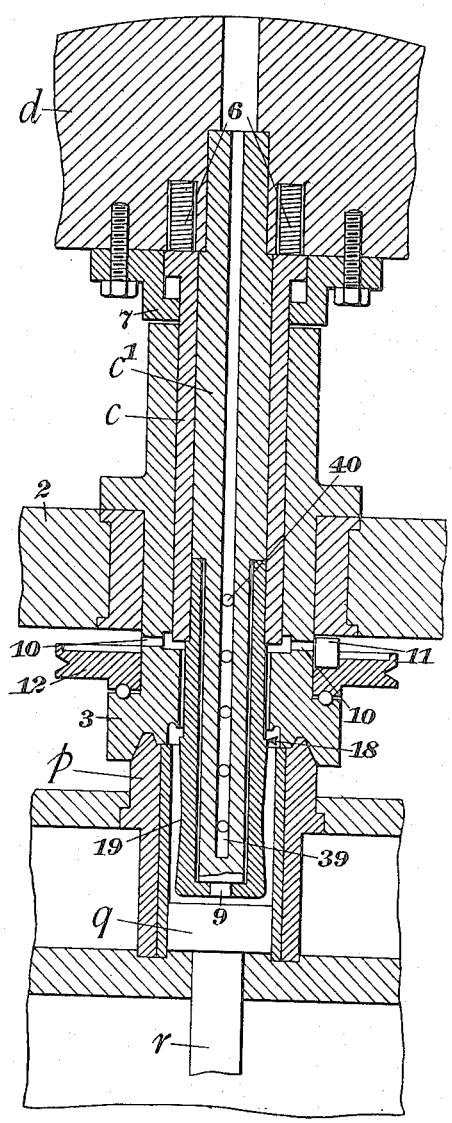
Figure 9:
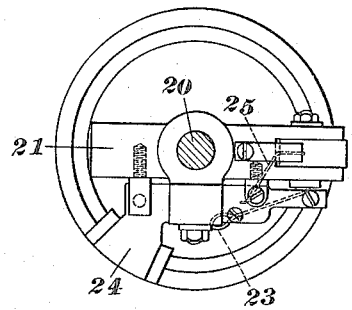
Fig. 9 is a sectional plan illustrating the action of the trimming tools.
Figure 8:
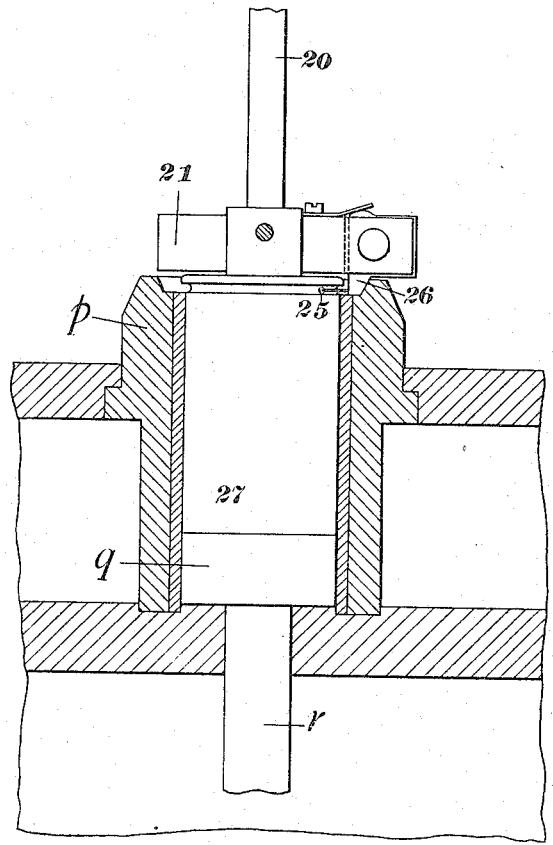

At its lower end an aperture 8 is provided in the part $c$, and such aperture is opened or closed by a projection 9 on the part $c'$. Air can gain admission to or pass from the die through a channel 39 in the part $c'$ and lateral apertures 40, a clearance space between the parts $c$ and $c'$, and the aperture 8. The ram parts $c$ and $c'$ move together in the operative stroke until the part $c$ is arrested by the clay billet in the die. The part $c'$ continues its motion until the aperture 8 is closed by the projection 9 and the said part abuts against the inner side of the part $c$. Both parts then move together and complete the pressing action which causes the clay to flow upward and fill the aperture between the part $c$ and the die $p$. The initial relative positions of the parts $c$ and $c'$ after the cover has closed the upper end of the die is shown in Fig. 4 while the final position is shown in Fig. 5. Superfluous material is extruded through an annular passage between the ram $c$ and the cover 3, and lateral openings 10 in the said cover. Such surplus material is cut away or removed by a scraping tool or tools 11 carried on a rotating pulley 12 mounted on the cover as shown. Rotation of the pulley 12 is obtained by a belt from a pulley 13 on the countershaft 14. To enable a constant tension to be maintained on the belt during the vertical movements of the crosshead, a jockey pulley 15 is employed, such pulley being carried on an arm 16 which is pivoted to a fixed point on the machine frame and also to one end of an arm 17 on the crosshead. To sever the material in the die from that in the space between the ram $c$ and the cover 3, the ram $c$ is provided with a shearing edge 18. This edge also serves to clear the said space during each ascent of the ram part $c$. During the ascent of the ram parts, the part $c'$ moves first and thereby opens up a free passage for air to the pot which prevents distortion of the latter due to suction, and finally the two parts move out together, and when the ram is clear of the die the cover is raised.

It is essential that the die cover should close the die before the plunger commences its operation on the clay or before it has proceeded so far in the pressing operation that the displaced clay reaches the mouth of the die. Also the cover remains in contact with the die until the plunger has been completely removed.

For effecting the release of the material of the pot from the die, the surface of the outer ram part $c$ is made to a slightly undulating or sinuous form, or is otherwise constructed and arranged so that on its withdrawal from the die it will impart a minute lateral movement to the material forming the pot that will not affect its shape or appreciably alter its dimensions, but will be sufficient to cause such a release of the material from the surface with which it contacts as to permit of the easy withdrawal of the pot, quite unimpaired, by the ascent through the die of the sliding bottom piece hereinbefore referred to.

In the drawings at Figs. 3 to 5 a single constriction 19 is shown in the operative portion of the part $c$. The amount of such constriction is exaggerated for purposes of illustration. Two or more of such constrictions may be adopted. Or the outline of the ram in section may be made to a very flat wavy form. Alternatively, a slight enlargement may be provided at the lower end of the ram. In all cases, however, the object is to produce a sufficient internal displacement or motion within the material of the pot during the ascent of the ram and while the pot is held in the die by the cover, as will effect the required liberation of the pot from the die. A configuration as indicated in the drawing is found to be satisfactory in practice.

The trimming of the upper or open end of the pot and the cutting of the string groove or the like near such end is accomplished after the table has carried the pot to the next stage by the automatic advance on to the pot of a pair of tools, the cutting or operative parts of which preferably comprise a wire made to a looped or such other form as will provide ample clearance way for the escape of the waste material.

The trimming and grooving tools are shown in detail at Figs. 6 to 10. A rotating shaft 30 is fitted at its lower end with a tool carrier 21. The shaft is supported by suitable brackets as shown on one of the vertical guides of the machine, provision being made for free vertical movements of the shaft relatively to such brackets.

Rotation is effected by a pulley 22 which is driven by a belt from the countershaft 14. Free endwise movement of the pulley is restrained by the brackets. At its upper end the shaft is connected to one of the rods 4 and at its lower end to the supplementary crosshead 2 from which it receives its vertical movements.

The carrier 21 is provided with a trimming tool 23 for operating on the edge of the pot, and a grooving tool which produces the string groove. Each tool is secured to a block pivoted on the carrier. The block 24 of the trimming tool is shaped to fit saddle-wise on the upper edge of the die. By contact with the die the said block is so rocked that its tool is advanced into operative contact with the work as shown in Fig. 7. Rotation of the tool carrier by the shaft causes the tool to traverse around the edge of the pot and impart to it the required rounded or other configuration. Simultaneously the grooving tool 25 is advanced into position by the interaction of an inclined portion on its block 26 with the upper edge of the die, and caused to produce the required groove while carried round by the shaft. The grooving tool is shown separately at Fig. 8. Suitable springs may be fitted to rock the blocks and carry the tools away from the work when the shaft and tool carrier are raised. The diagram at Fig. 10 shows the tools in the operative position on the pot, to a larger scale than Figs. 6 to 9. In all the views the pot is indicated by 27.

After the trimming and grooving the pot is moved by the next action of the table to the discharge position where the pot is ejected by the mechanism hereinbefore described.

Figure 11:
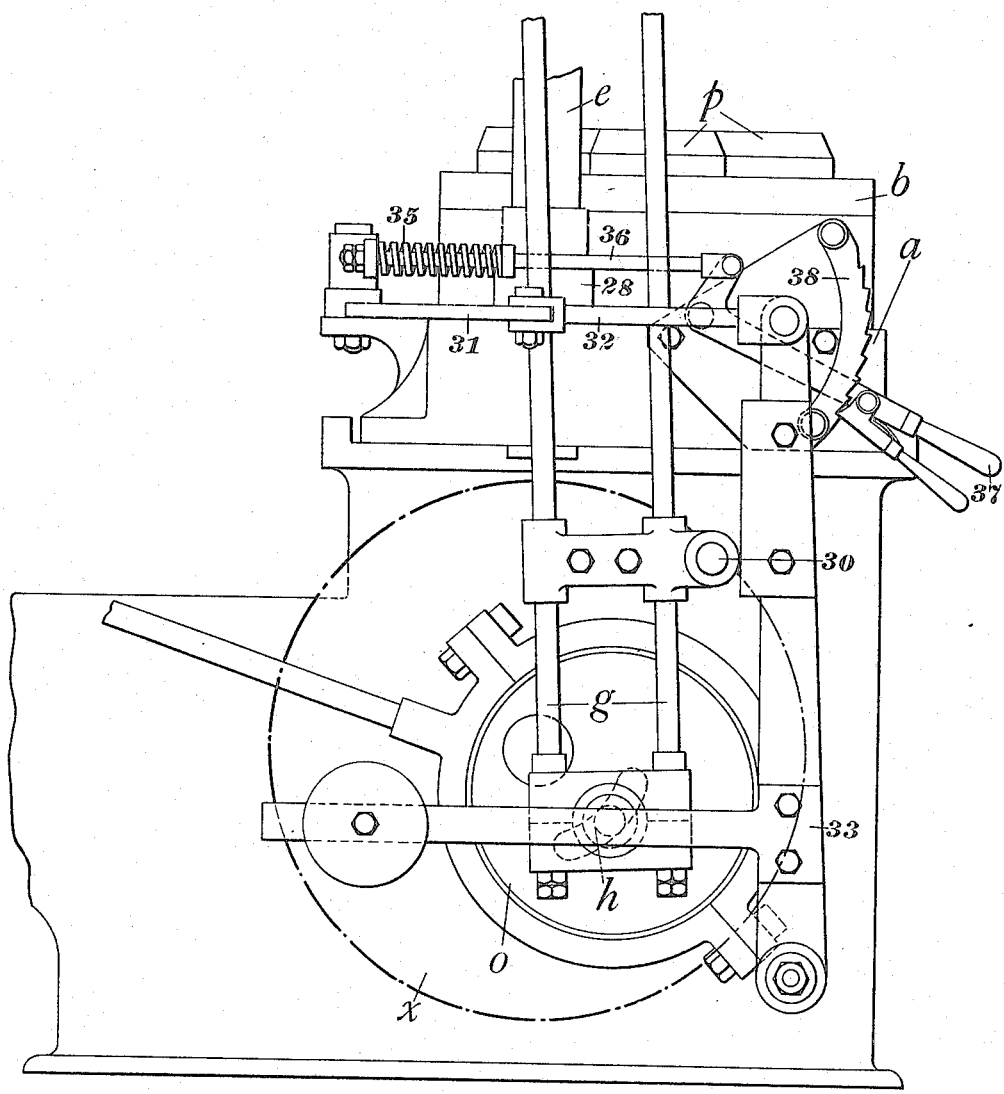
Fig. 11 is a side elevation and Fig. 12 a plan of the check or controlling mechanism associated with the work table.
Figure 12:
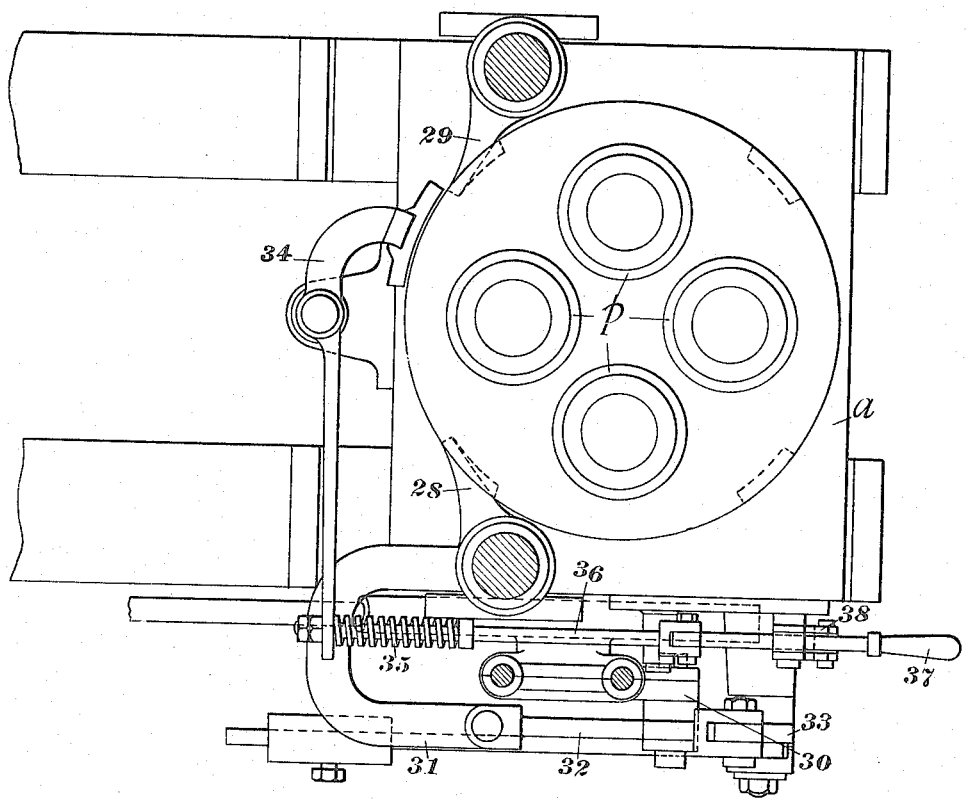

In the machine illustrated, four dies are provided corresponding to the four stages in the cycle of operations, namely, charging, pressing, trimming and ejecting. For securing the table between the successive transitions and insuring proper positioning of the dies beneath the pressing and trimming tools the mechanism illustrated in detail at Figs. 11 and 12 is preferably adopted. The table *a* is notched around its periphery, and in conjunction with a pair of the notches are arranged a pair of pawls 28 and 29, the latter being spring or weight controlled and the former actuated automatically from a striking piece 30 on the adjacent connecting or side rod *g*. Such pawl 28 is coupled by links 31 and 32 to a counter-weighted or spring-controlled lever 33. The relative positions of the piece 30 and lever 33 is adjusted so that immediately prior to a rotational movement of the table the piece 30 acts upon the lever 33 and causes the latter to withdraw the pawl from engagement with the table. Accidental reverse rotation of the table is prevented by the check pawl 29. During the action of the pressing ram and trimming tool the pawls hold the table securely against displacement. To prevent any shake in the table due to clearance between the ends of the pawls and the table notches which they engage a brake 34 may advantageously be used. Such brake is applied through a spring 35, link 36 and hand lever 37 which engages a notched quadrant 38.

Drying, glazing, baking and other ordinary treatments of the pots after discharge from the machine is accomplished in the usual manner.

The invention is not limited to machines of any one form or type but is applicable to variously constructed and arranged machines adapted to meet varying services or requirements.

Having thus described my invention what I claim as new and desire to secure by Letters Patent is:—

1. In a machine for manufacturing jam pots and like earthenware receptacles, the combination comprising a die, a die cover which closes the die throughout the pressing operation, and a pressing ram having a locally contracted operative surface whereby the ram is adapted to be withdrawn from the die without distorting the molded article, substantially as described.

2. In a machine for manufacturing jam pots and like earthenware receptacles, the combination comprising a die, a die cover, a pair of parts forming a pressing ram which parts are relatively movable in an axial direction and are adapted to permit the passage of air through the same, the outer part being formed with a locally contracted operative surface, substantially as described.

3. In a machine for manufacturing jam pots and like earthenware receptacles, the combination comprising a die, a die cover, and a pressing ram having a locally contracted operative surface, the said ram and cover being adapted to provide a clearance between them when the ram is at the end of its operative stroke through which clearance superfluous material can escape, substantially as described.

4. In a machine for manufacturing jam pots and like earthenware receptacles, the combination comprising a die, a die cover, a ram having a locally contracted operative surface, and a shearing edge on the ram adapted by its coöperation with the edge of the aperture in the cover through which the ram passes to separate the molded article from the superfluous material, substantially as described.

5. In a machine for manufacturing jam pots and like earthenware receptacles, the combination comprising a die, a die cover formed with apertures for the escape of superfluous material, a ram having a locally contracted operative surface, and a tool rotatably mounted on the die cover and adapted to detach the extruded material, substantially as described.

6. In a machine for manufacturing jam pots and like earthenware receptacles, the combination comprising a die, a die cover, a ram having a locally contracted operative surface, a rotating tool carrier, a trimming tool mounted on said carrier, and means for conveying the die with the contained molded article from the pressing ram to the trimming tool, substantially as described.

7. In a machine for manufacturing jam pots and like earthenware receptacles, the combination comprising a rotatable table, dies on the said table, a die cover, a ram with a locally contracted operative surface, a rotating tool carrier, a pivoted tool holder on said carrier adapted to coöperate with the upper edge of the die and bring the said holders into the operative positions, trimming tools on said holders, and means for imparting intermittent angular movements to the table, substantially as described.

8. In a machine for manufacturing jam pots and like earthenware receptacles, the combination comprising a rotatable table, dies in said table, a coaxially mounted and interconnected die cover and pressing ram, said cover and ram being movable conjointly and independently and the ram having a locally contracted operative surface, a rotating tool carrier, trimming tools mounted on said carrier, an ejecting plunger, means for imparting intermittent angular movements to the table whereby each die in turn is moved to the ram, the trimming tools and the ejecting plunger, and means for locking the table against accidental movement when at rest, substantially as described.

In testimony whereof I have signed my name to this specification in the presence of two subscribing witnesses.

EDMUND WILLIAM LEIGH.

Witnesses:
JOHN MORGAN,
JOHN SMITH HALL.

Copies of this patent may be obtained for five cents each, by addressing the "Commissioner of Patents, Washington, D. C."